United States Patent
Rajamani et al.

(10) Patent No.: US 7,881,880 B2
(45) Date of Patent: Feb. 1, 2011

(54) ACTUATOR PERFORMANCE MONITORING SYSTEM

(75) Inventors: Ravi Rajamani, West Hartford, CT (US); Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 22 days.

(21) Appl. No.: 12/416,670

(22) Filed: Apr. 1, 2009

(65) Prior Publication Data

US 2010/0256853 A1    Oct. 7, 2010

(51) Int. Cl.
*G01B 3/44* (2006.01)

(52) U.S. Cl. ...................................... 702/34

(58) Field of Classification Search .................. 702/34, 702/183, 184
See application file for complete search history.

(56) References Cited

U.S. PATENT DOCUMENTS

| | | | |
|---|---|---|---|
| 5,636,507 A | 6/1997 | Rajamani et al. | |
| 5,650,623 A | 7/1997 | Rajamani et al. | |
| 5,857,321 A | 1/1999 | Rajamani et al. | |
| 6,678,052 B1 | 1/2004 | Hanagandi et al. | |
| 6,694,742 B2 | 2/2004 | Rajamani et al. | |
| 6,909,960 B2 | 6/2005 | Volponi et al. | |
| 7,136,809 B2 | 11/2006 | Volponi | |
| 7,216,071 B2 | 5/2007 | Volponi | |
| 7,233,884 B2 | 6/2007 | Volponi | |
| 7,277,838 B2 | 10/2007 | Volponi et al. | |
| 7,415,328 B2 | 8/2008 | Volponi | |
| 7,441,448 B2 | 10/2008 | Volponi | |
| 7,472,100 B2 | 12/2008 | Volponi et al. | |
| 7,705,601 B2 * | 4/2010 | Zhou et al. ................ | 324/424 |
| 2008/0177505 A1 | 7/2008 | Volponi | |
| 2008/0221835 A1 | 9/2008 | Volponi | |
| 2009/0055145 A1 | 2/2009 | Volponi et al. | |

* cited by examiner

*Primary Examiner*—Drew A Dunn
*Assistant Examiner*—Stephen J Cherry
(74) *Attorney, Agent, or Firm*—O'Shea Getz P.C.

(57) ABSTRACT

A method for monitoring performance of an actuator is provided that includes the steps of: 1) determining an actuator response time constant in a control system, which actuator response time constant is representative of a task time taken by the actuator to complete a selected percentage of a task; 2) determining a rate of change of the actuator response time constant over a predetermined number of events; 3) determining a fault value indicative of when the actuator response time constant will equal or exceed an error time constant using the determined rate of change of the actuator response time constant; and 4) outputting a signal from the control system representative of the determined fault value.

12 Claims, 2 Drawing Sheets

ACTUATOR PERFORMANCE MONITORING SYSTEM

BACKGROUND OF INVENTION

1. Technical Field

This disclosure relates generally to monitoring actuator systems and, more particularly, to systems for monitoring actuator performance to predict degradation in future performance of an actuator.

2. Background Information

Actuators are used to perform various tasks in industrial systems. For example, in an aeronautical system, an actuator may move a control piston from one position to another position by energizing a coil or opening/closing a hydraulic valve. Typically, the actuator initiates the task upon receiving a control signal from a control system. The control system may further be configured to monitor the performance of the actuator. For example, the control system may receive a feedback signal when the actuator is performing, or has completed the initiated task. The feedback signal is subsequently compared with the control signal to determine if the response of the actuator is within a predetermined error band. Where the response is outside of the error band, the control system communicates a signal indicating an actuator error. Prior art actuator monitoring systems do not have the capability to predict problems with a particular actuator based on the actual performance of that actuator. Consequently, when using prior art monitoring systems it is not uncommon to have unexpected problems that are disruptive and require expensive last minute corrective actions. As a result, there is a need in the art for an actuator monitoring system capable of indicating when an actuator is likely to fail.

SUMMARY OF THE DISCLOSURE

A method for monitoring performance of an actuator is provided that includes the steps of: 1) determining an actuator response time constant, which actuator response time constant is representative of a task time taken by the actuator to complete a selected percentage of a task; 2) determining a rate of change of the actuator response time constant over a predetermined number of events; 3) determining a fault value indicative of when the actuator response time constant will equal or exceed an error time constant using the determined rate of change of the actuator response time constant; and 4) providing a signal representative of the determined fault value.

DETAILED DESCRIPTION OF THE INVENTION

A method for monitoring performance of an actuator for use with a gas turbine engine system, or a subsystem within the same, is provided. The actuator is any actuator that provides a function within a gas turbine engine; e.g., a linear actuator (i.e., a fluid piston), a rotary actuator, etc.

Figure 1:
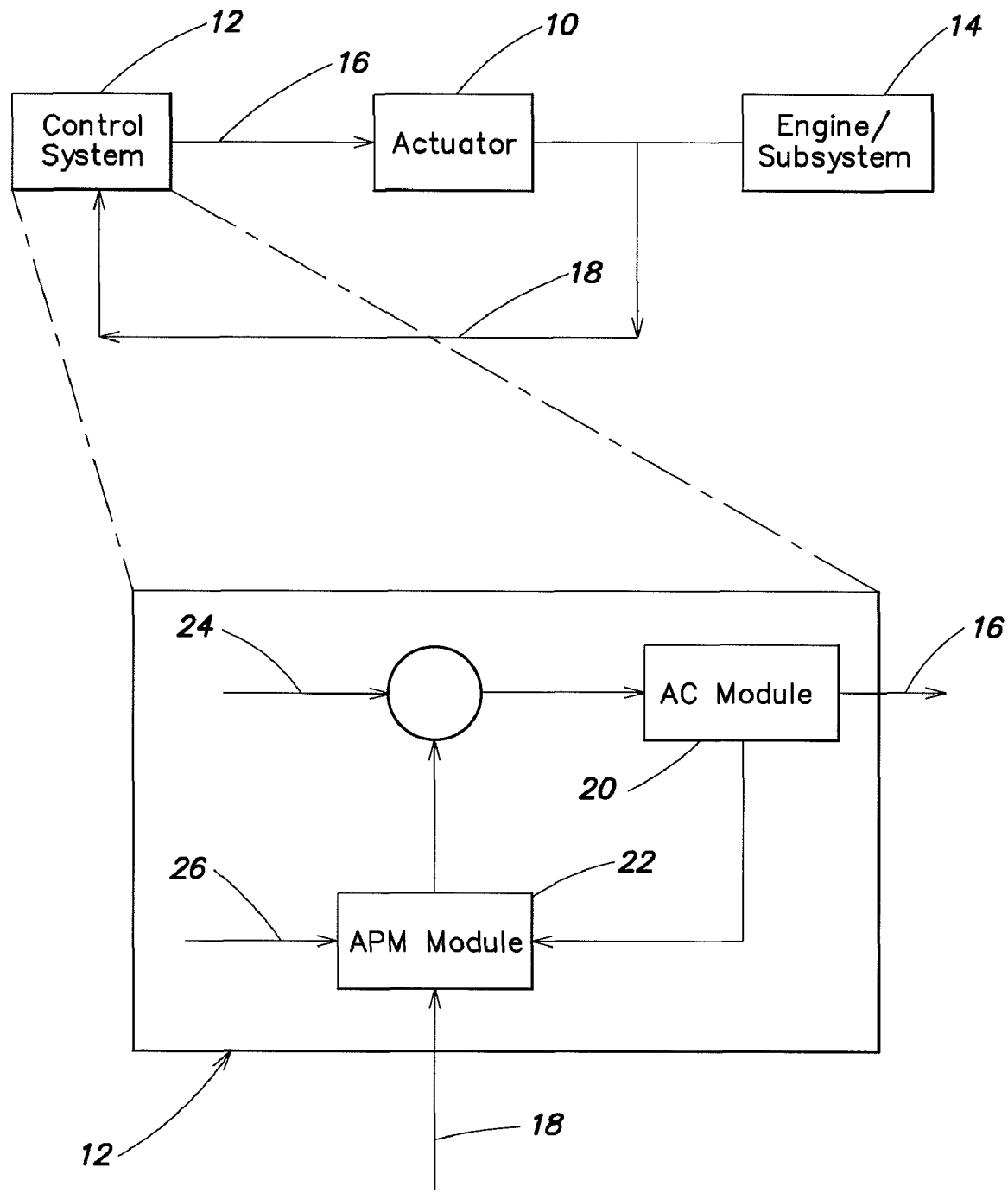
FIG. 1 is a block diagram illustrating a system for controlling and monitoring the performance of an actuator utilized within an engine system.

The actuator is in communication with a control system. An avionics control system disposed within an aircraft is an example of a control system. The present invention is not limited to avionics systems, however. The control system is adapted to cause the actuator to perform a desired task within the engine system, to monitor the actuator in the performance of the task, and in some embodiments to output a signal indicative of the performance of the actuator. FIG. 1 provides a block diagram illustrating the functionality of the actuator 10 and the control system 12 relative to an aircraft engine system 14, including an expanded view of the control system 12. The control system 12 produces an actuator command signal 16 and sends it to the actuator 10, commanding the actuator 10 to perform a certain task. The actual performance of the task is monitored and an actuator feedback signal 18 indicative of the actual performance is created and sent to the control system 12.

The control system 12 includes an actuator control module 20 ("AC Module") and an actuator performance monitor module 22 ("APM Module"). The AC Module 20 includes hardware and/or software adapted to cause the actuator 10 to perform, and also to monitor the performance of the actuator 10. The specific attributes of the AC Module 20 will depend on the type of actuator 10 and the application in which the actuator 10 is deployed. For example, in some embodiments, the AC Module and/or the APM Module can be configured as an integrated circuit. In other embodiments, the AC Module and/or the APM Module are functionally configured as software to be performed in a processor.

An actuator reference signal 24 and the actuator feedback signal 18 are input into the AC Module 20. The actuator reference signal 24 is indicative of the function to be completed by the actuator 10; e.g., a signal indicative of the desired position of the actuator 10. The actuator reference signal 24 and the actuator feedback signal 18 are compared to one another to determine if the actuator 10 has completed the desired task. The comparison yields an error signal that is used by the AC Module 20 to continue to drive the actuator 10 until the error signal is within a predetermined acceptable error band; e.g. the actuator position indicated by the feedback signal 18 is acceptably close to the actuator position represented by the actuator reference signal 24.

Control fault detection and annunciation logic within the APM Module 22 monitors the actuator command signal 16 and the actuator feedback signal 18, and determines the amount of time elapsed during the actuation process. The amount of time is determined using a time synchronization ("time synch") signal 26 provided to the APM Module 22 from a system clock. If the response of the actuator 10 is not within a predetermined error band, the control system 12 will annunciate a fault.

The amount of time evaluated within the control system 12 is typically the amount of time required for the actuator 10 to perform a particular percentage of the task to be performed;

e.g., an amount of time required to extend a linear actuator 66% of the overall stroke of the actuator. The particular percentage utilized is a matter of design choice and can be selected based on the actuator type and the task to be performed. This amount of time is referred to as a time constant (τ) of the actuator response. It should be noted that the aforesaid example is only one embodiment of the present invention and should not be limited thereby. In some embodiments, the only information available is whether the actuator is fully open or fully closed. In these embodiments, the time it takes to achieve the fully open or fully closed condition (which is sometimes referred to as the "slew rate" of the actuator) is used as the relevant time constant.

Actuator time constants can be determined and updated using a variety of different techniques and the present method is not limited to any particular technique. An example of a methodology for determining a time constant is disclosed within U.S. patent application Ser. No. 11/843,193 , which application is hereby incorporated by reference in its entirety.

Under the present method, the time constant indicative of the actuator response is monitored over a predetermined number of events. The term "predetermined number of events" is used to describe the frame within which the monitoring of the actuator response time constant takes place. For example, the actuator response time constant can be monitored over a period of time (e.g., a predetermined number of hours, etc.), or over "n" cycles of the actuator (where "n" is an integer), or over "n" cycles of the system in which the actuator performs, etc.

Figure 2A:
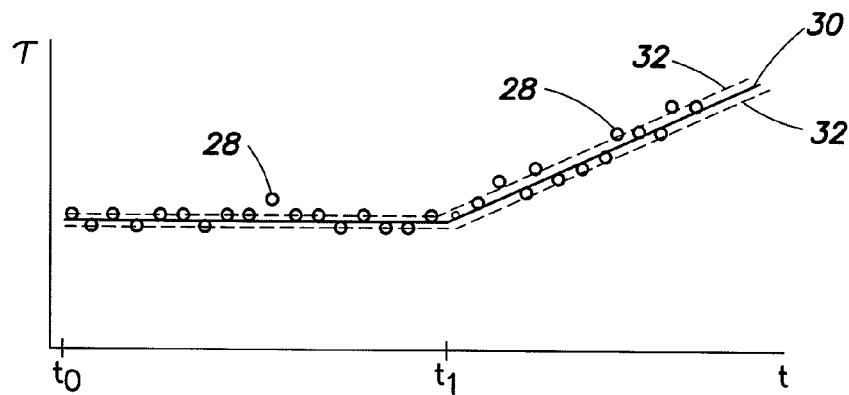
FIG. 2A graphically illustrates actuator response time constant values (Y-axis) versus time (X-axis) for a properly functioning actuator, as is evidenced by the uniform distribution of time constant values.
Figure 2B:
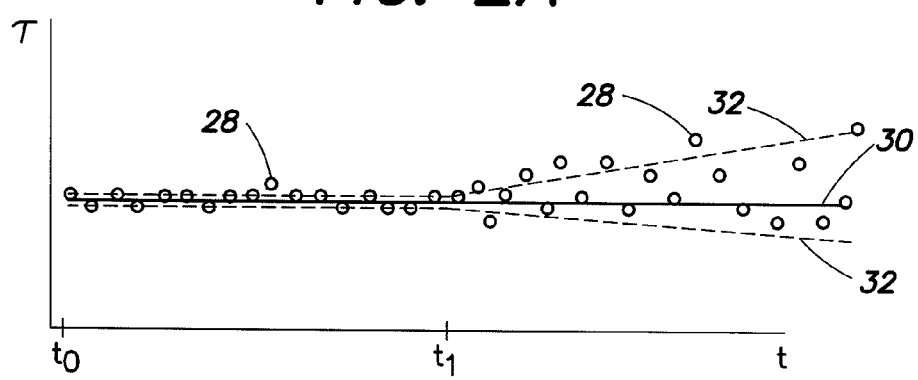
FIG. 2B graphically illustrates actuator response time constant values (Y-axis) versus time (X-axis) for an erratically functioning actuator, as is evidenced by the spread of time constant values.

The actuator response time constant is monitored to determine a rate of change over the number of events. The actuator response time constant rate of change can be determined using a variety of different techniques (graphical, mathematical, standard statistical process control methodology, etc.) and the present method is not limited to any particular technique. FIGS. 2A and 2B graphically illustrate actuator response time constant values (Y-axis) versus time (X-axis), where element 28 is indicative of the time constant at a discrete number of events, element 30 is indicative of a mathematical mean of the time constants, and elements 32 are indicative of mathematical variances in the time constants. The time constants in both figures remain substantially uniform between $t=t_0$ and $t=t_1$, which is typically representative of a properly functioning actuator. In both figures, the time constant changes after $t=t_1$. In FIG. 2A, the functional degradation of the actuator is indicated by the fact that the time constants increase relatively linearly. In FIG. 2B, the functional degradation of the actuator is indicated by the random, erratic changes in time constant after $t_1$.

Figure 3:
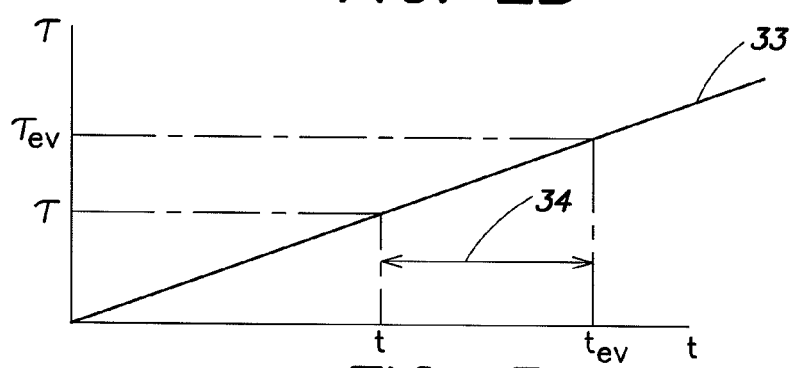
FIG. 3 is a graph of time constant versus time illustrating the rate of change of the time constant value over time, and a difference in time between the time ("t") associated with a current time value constant and the time ("$t_{ev}$") associated with a predetermined error value constant.

Once it has been determined that the actuator response time constant is changing, the rate of change can be estimated and, in some instances, can be used to project actuator response time constant values as a function of the number of events. Using the graph shown in either FIG. 3 or 4, for example, actuator response time constant values can be projected as a function of time by determining the equation of the line 33 representing the time constant versus time. In some embodiments, the rate of change of the actuator response time constant is determined periodically and renewed. Consequently, if the performance of an actuator negatively accelerates, that periodically updated rate of change will reflect the actual performance. The rate at which the rate of change is updated is selected based on the actuator and the system in which it is disposed; e.g., if because of a change of circumstance (e.g., new actuator source, etc.) an actuator is found to fail at an increased rate, the rate at which the rate of change is determined can be increased. In those instances where the time constant degrades erratically (e.g., the value of the time constant substantially fluctuates, as is shown in FIG. 2B), a variance 32 of the time constants is determined. The variance 32 is a measure of deviation of a mean 30 of the plotted time constants. When the variance 32 is equal to or greater than a threshold over a predetermined number of events, the control system outputs a signal indicative of a diagnostic alert.

In many systems, the response time constant for an actuator is monitored. When it reaches a particular value (referred to as an "error value"), the performance of the actuator 10 will no longer be acceptable, and the actuator 10 will be repaired or replaced. As indicated above, prior art systems include monitoring the response time of an actuator 10, and when the time constant error value is reached, a fault signal is provided.

Figure 4:
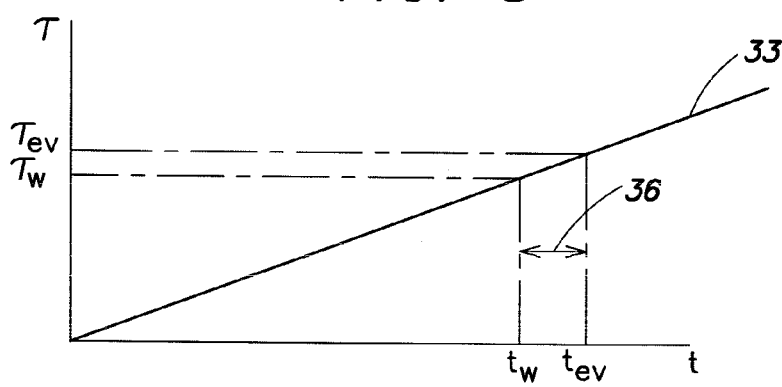
FIG. 4 is a graph of time constant versus time illustrating the rate of change of the time constant value over time, and a difference in time between the time ("$t_w$") associated with a warning time value constant and the time ("$t_{ev}$") associated with a predetermined error value constant.

Under the present method, the determination of the rate of change of the actuator response time permits a determination of the number of events that are predicted to occur before the time constant error value is reached. For example, the amount of time 34 between the current actuator response time constant (t) and the time at which the error value time constant ($t_{ev}$) will be reached can be determined using the graph shown in FIG. 3 so the operator of the system can plan accordingly for corrective action before the time at which the $t_{ev}$ is reached. Under the present method the actuator control system can also be programmed to issue a warning signal indicating that an actuator problem is forthcoming within a particular time period. FIG. 4 illustrates a predetermined time ($t_w$) at which a warning will be issued to the system operator. The warning time value ($t_w$) can be determined as a function of several parameters, including the rate of change of the actuator response time constant, the amount of time 36 left until $t_{ev}$ is reached, etc.

The present method provides a methodology that can be used to schedule maintenance when it is convenient for the operator of the system, which is typically a time when the useful life of the actuator has been taken advantage of, and a time when it is less expensive to do whatever maintenance work is required.

While various embodiments of the system and method for monitoring the performance of an actuator have been disclosed, it will be apparent to those of ordinary skill in the art that many more embodiments and implementations are possible within the scope of the method.

What is claimed is:

1. A method for monitoring performance of an actuator, comprising:
   determining an actuator response time constant in a control system, which actuator response time constant is representative of a task time taken by the actuator to complete a selected percentage of a task;
   determining a rate of change of the actuator response time constant over a predetermined number of events;
   determining a fault value indicative of when the actuator response time constant will equal or exceed an error time constant using the determined rate of change of the actuator response time constant; and
   outputting a signal from the control system representative of the determined fault value.

2. The method of claim 1, wherein the predetermined number of events is a selected period of time in which the actuator performs tasks.

3. The method of claim 2, wherein the fault value is a period of time until the actuator response time constant will equal or exceed the error time constant.

4. The method of claim 1, wherein the predetermined number of events is a selected number of tasks performed by the actuator.

5. The method of claim 4, wherein the fault value is a number of tasks that will be performed by the actuator until the actuator response time constant will equal or exceed the error time constant.

6. The method of claim 1, further comprising the step of providing a warning signal when the actuator response time constant equals a time constant warning value and determining the event at which the actuator response time constant equals the time constant warning; and determining a second fault value indicative of when the actuator response time constant will equal or exceed the error time constant using the determined rate of change of the actuator response time constant, from the event at which the actuator response time constant equals the time constant warning.

7. The method of claim 6, wherein the time constant warning value is determined based on a second predetermined number of events occurring until the error time constant is reached using the determined rate of change.

8. The method of claim 1, wherein the rate of change is periodically determined and updated.

9. The method of claim 1, wherein the predetermined number of events is a selected number of events that occurs in a system within which the actuator is disposed.

10. The method of claim 9, wherein the fault value is a number of the events that occur within the system until the actuator response time constant will equal or exceed the error time constant.

11. The method of claim 1, wherein the control system is configured as at least one of an integrated circuit and a processor.

12. The method of claim 1, wherein the control system includes an actuator performance monitoring module.

* * * * *